US007372587B1

(12) United States Patent
Altrieth, III

(10) Patent No.: US 7,372,587 B1
(45) Date of Patent: May 13, 2008

(54) ORDERED MEDIA JAM RECOVERY SYSTEM AND METHOD

(75) Inventor: Frederick E. Altrieth, III, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 825 days.

(21) Appl. No.: 10/673,602

(22) Filed: Sep. 29, 2003

Related U.S. Application Data

(60) Provisional application No. 60/414,813, filed on Sep. 30, 2002.

(51) Int. Cl.

| | |
|---|---|
| ***G06F 7/00*** | (2006.01) |
| ***G06F 1/00*** | (2006.01) |
| ***G06F 15/00*** | (2006.01) |
| ***B41F 21/00*** | (2006.01) |

(52) U.S. Cl. .................... 358/1.14; 358/1.12; 358/1.15

(58) Field of Classification Search .............. 358/1.15, 358/296, 1.14, 1.12

See application file for complete search history.

(56) References Cited

U.S. PATENT DOCUMENTS

| | | | | |
|---|---|---|---|---|
| 5,859,711 A * | 1/1999 | Barry et al. | ................ | 358/296 |
| 6,049,391 A * | 4/2000 | Farrell | ........................ | 358/1.15 |
| 2002/0101607 A1* | 8/2002 | Hull | .......................... | 358/1.15 |

* cited by examiner

*Primary Examiner*—King Y. Poon
*Assistant Examiner*—Lennin R Rodriguez
(74) *Attorney, Agent, or Firm*—Richard A. Romanchik; Robert L. Walker

(57) ABSTRACT

A printer includes multiple source trays, an output destination, and a media path. The media path couples the source trays to the output destination. Ordered media is loaded within one or more source trays. The printer is configured to automatically recover from a jam when processing the ordered media by selectively shedding selected ordered media from a source tray. A method of recovering from the jam includes generating a request that identifies the insertion order of selected ordered media, inserting the selected ordered media within an output; and purging selected ordered media when a jam occurs to provide a uniform output.

17 Claims, 7 Drawing Sheets

ORDERED MEDIA JAM RECOVERY SYSTEM AND METHOD

RELATED APPLICATIONS

Priority is hereby claimed to U.S. provisional patent application serial number 60/414,813 titled ORDERED MEDIA JAM RECOVERY SYSTEM AND METHOD filed Sep. 30, 2002, said application being hereby incorporated by reference in its entirety.

The following copending and commonly assigned U.S. patent applications relate to and further describe other aspects of the embodiments disclosed in this application and are incorporated by reference in their entirety.

U.S. patent application Ser. No. 09/772,384, "Method and Apparatus of Disposing of Unused Ordered Media Within a Print Job," filed on Jan. 19, 2001.

U.S. patent application Ser. No. 09/803,387, "System and Method for Visual Representation and Manipulation of Tabs on a Production Printer," filed on Mar. 9, 2001.

FIELD OF THE INVENTION

This invention relates to a system and a method for controlling ordered media, and more particularly, to a system and a method of jam recovery.

BACKGROUND

A production printer is capable of producing large volumes of documents. Some of these printers process large volumes of paper, use multiple media types, draw from multiple sources, and automatically finish a desired document. Despite advances in technology, production printing can be complicated and can involve many manual processes. These processes can include identifying and loading the correct media, identifying and loading the proper weight, color, type, and stock of paper, and selecting the proper insertion of ordered media between pages of a document.

When using an ordered media in a production printer, it can be necessary to manually separate and selectively dispose of some of the ordered media. When a jam occurs, for example, an operator must manually clear the jam, and in some instances, determine the precise number and current sequence of the ordered media loaded within the supply trays. To restore the output to a proper order, an operator may be required to manually reorder the ordered media within the supply trays before printing resumes.

Some jam recovery methods utilize electronic counts to selectively discard some ordered media to maintain output continuity. These methods require an operator to know the total number of sheets within an ordered media set and further require the operator to preprogram the printer with the sequence of sheets that make up an ordered media set before initiating a print request. These methods can further complicate the printing process and can waste a significant amount of time and resources when the printers are not programmed correctly or are loaded with improper ordered media. Accordingly, there is a need for a jam recovery system and method that do not require operator programming to restore a printing operation in the event of a jam or limit a printer's functionality by the number of sheets that comprise a complete ordered media set.

SUMMARY

The present invention is defined by the following claims. This description summarizes some aspects of the described embodiments and should not be used to limit the claims.

A printing system embodiment includes multiple source trays and an output destination and a media path. The media path couples the source trays to the output destination. Ordered media is loaded within one or more source trays. The printer is configured to automatically recover from a jam when processing ordered media by purging selected ordered media from the source tray.

A method of recovering from a jam includes generating a request that identifies the insertion order of the selected ordered media, inserting the selected ordered media within an output; and purging other ordered media when a jam occurs.

Further aspects and advantages of the invention are described below in conjunction with the embodiments.

DETAILED DESCRIPTION

Figure 5A:
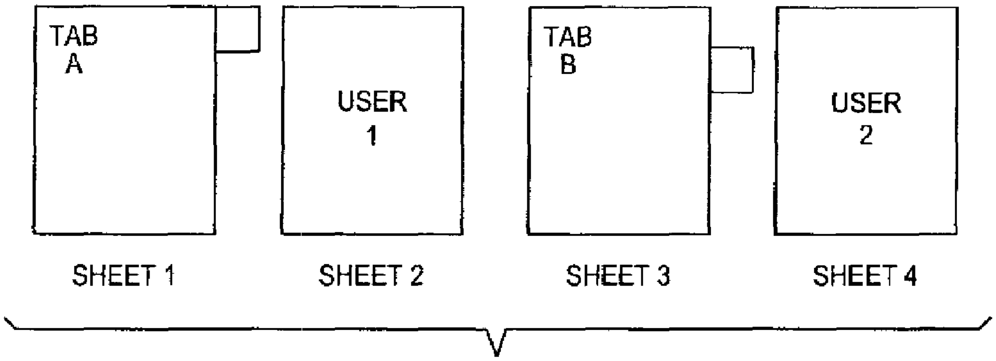
FIG. 5*a* is a block diagram of an exemplary ordered media set inserted between exemplary user sheets.
Figure 5B:
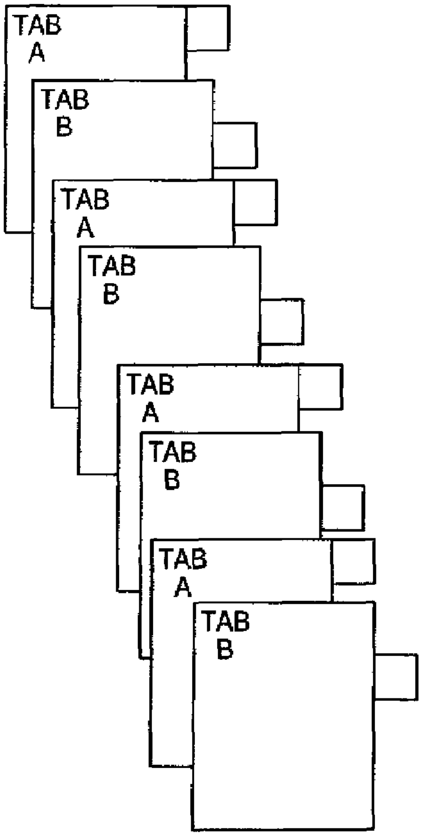
FIG. 5*b* is a block diagram of an exemplary ordered media set loaded in a supply tray.

The jam recovery system and method provide users with a convenient apparatus and method that automatically restores an ordered media to a proper sequence in the event of jam. The term "ordered" media is used to describe media that is precollated or prearranged in a defined group or groups. FIG. 5*b* provides an illustration of such a prearranged group as it would be loaded in a supply tray. Other terms used to describe ordered media are preordered, precollated, tab stock, ordered insertions, etc. Such media may include an ordered media in which a set contains a number of elements loaded in a predetermined sequence such as a set of tab stock, photos, preprinted media, offset section dividers, etc. For example a specific kind of ordered media could be two position tab stock wherein each sheet of the tab stock is provided in a specific position in the order. (FIG. 5*b*) By selectively purging ordered media, the system and method automatically maintains output continuity after a jam is cleared. The system and method do not require a user to preprogram the printer according to a sequence of ordered media. The system and method automatically arrange the correct placement of ordered media without determining the sequence or number of sheets in an ordered media set.

Figure 1:
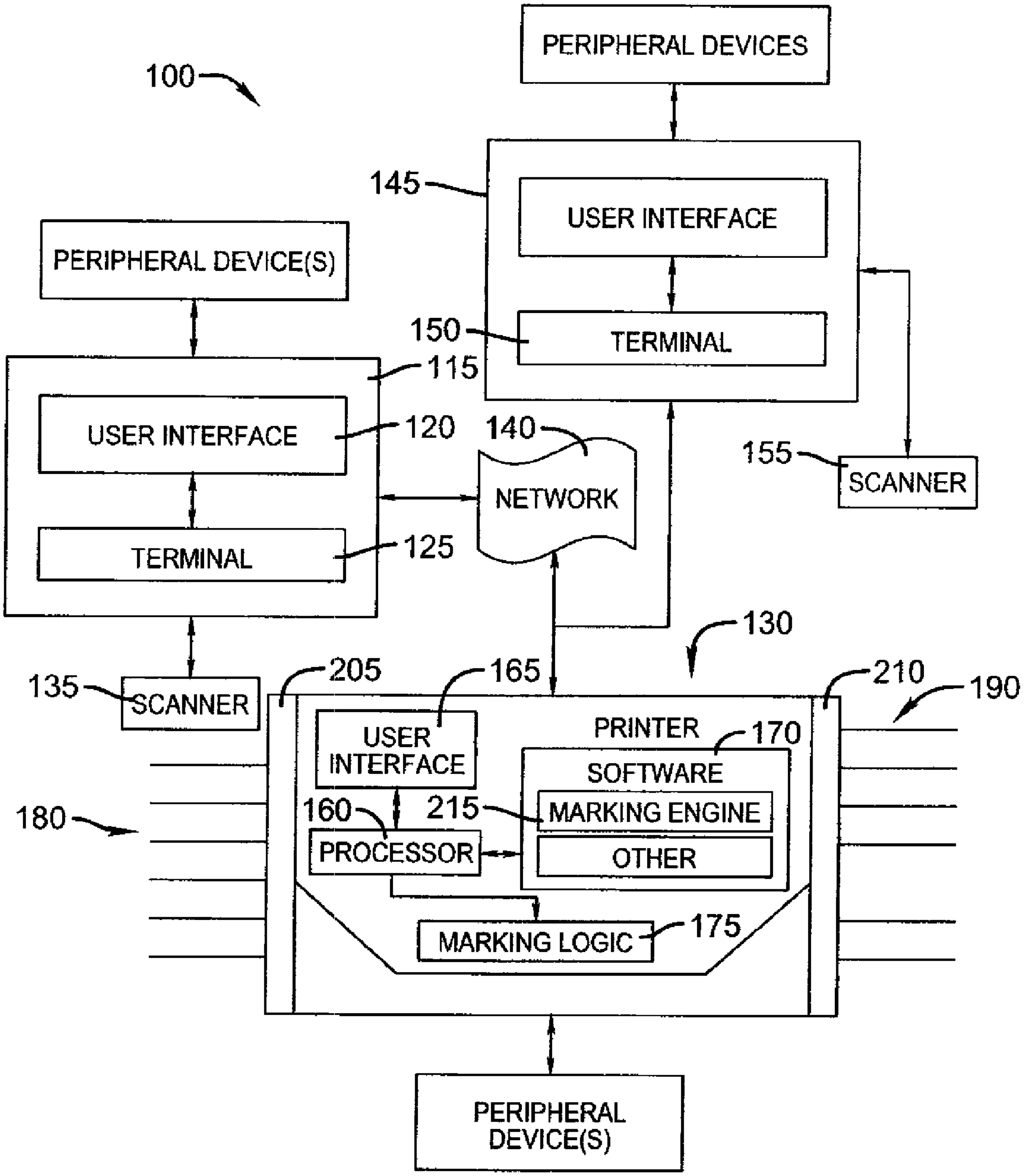
FIG. 1 is a block diagram of an embodiment of a printing system.

FIG. 1 is a block diagram of an embodiment. This embodiment illustrates a printing system 100 that has one or more input sources 180 and one or more output destinations

190. The printing system 100, which encompasses a digital printing system and/or a duplicating system, is loaded with ordered media. The ordered media comprises sheets arranged in a predetermined order.

The printing system 100 facilitates the translation of a physical representation (e.g., a printed page) of an image into digital data. The printing system 100 is a multiuser system that supports local and/or remote interface(s). As shown, local and remote interfaces 115 and 145 are terminals that are part of a network printing system. The printing system 100 can provide users with one or more features such as the insertion of separator sheets, insertion of ordered media, multiple set collating, two sided printing, printing pages on different paper stock, stapling, offset stacking, booklet printing, folding, accent color, use with transparencies, use with slides, etc.

The remote interface 115 includes a user interface 120 coupled to a terminal 125 located at a site removed from a printer 130. In the illustrated embodiment, the terminal 125 comprises a computer or a workstation, which is a combination of input (e.g., pointing device(s), keyboard(s), etc.,), output (e.g., display(s), serial interfaces(s), and/or parallel interface(s), etc.,), and computing hardware. This combination can include a graphics based system such as a graphical user interface (GUI) and/or a command based system such as a command line interface. While the remote interface 115 shown in FIG. 1 includes a scanner 135 that can transmit images through the remote interface 115, alternative embodiments support many other peripherals. Like some local interfaces, the remote interface 115 can originate print files and/or print requests and/or act as a receiving source that captures data (e.g., a receptor) from external sources to be processed by the printer 130. A print request originating from the remote or local interfaces 115 and 145 identifies how the documents are to be printed, how they should be processed by the printer 130 and by the optional finishing devices. Such a print request, for example, identifies the points of insertion of an ordered media. Once specified, a sheet list is created by the printer that identifies each media sheet that will be printed, processed (e.g., transported to an alternate or trash exit) and/or inserted within the printed document. Alternatively, the sheet list includes sheet attributes.

The remote interface 115 is coupled to a network printing system that communicates through a communication link. Software captures user input, builds a print request, and transfers the request to the printer 130 by a network 140 or a print server. As shown, the network 140 provides connectivity between the remote interface(s) 115 and the printer 130 resulting in the printing of a document. Many network architectures can be used including publicly accessible networks such as the Internet, privately accessible networks such as an intranet, a circuit switched network, a data packet network, an Ethernet Network, a Wide Area Network, and/or a Local Area Network, etc.

Like the remote interface 115, the local interface 145 also has many configurations. In the illustrated embodiment, the local interface 145 comprises a terminal 150, which encompasses a computer or a workstation. The local terminal 150 comprises a combination of input (e.g., pointing device(s), keyboard(s), etc.,), output (e.g., display(s), a serial interface(s), and/or parallel interface(s), etc.,), and computing hardware. This combination includes a graphics based system such as a graphical user interface (GUI) and/or a command based system such as a command line interface. While the illustrated local interface 145 shown in FIG. 1 includes a scanner 155 that can transmit images through the local interface 145 to the printer 130, alternative embodiments support many other peripherals. Like some remote interfaces, the local interface 145 can originate print files and/or print requests and/or act as a receiving source that captures data (e.g., a receptor) from external sources to be processed by the printer 130.

As shown in FIG. 1, the remote and local interfaces 115 and 145 capture input and build print files or requests that are transferred either directly to the printer 130 or to a print server or a network 140. The printer 130 includes a processor 160, a user interface 165, software 170, and marking logic 175. The processor 160 manages some or all aspects of printing one or multiple jobs using the marking logic 175. Although many controller infrastructures can be used, the processor 160 uses one or more data processors arranged in a serial, parallel, or a multiprocessing configuration. The processor(s) manages the pattern of media transports from the source(s) 180 through the media path(s) 185 (shown in FIG. 2) which include the final output destination(s) 190. In this embodiment, the processor 160 also interprets and executes instructions to achieve the desired output characteristics of a printed document. In some embodiments, these characteristics include image scaling, image resolution, image darkness and intensity control, order control, the selection of media(s) for an output set, the stapling of sheets in an output set, the binding of sheets in an output set, the punching of holes in an output set, and other attributes a user desires.

The printer 130 maintains data within a memory. The printer 130 has an open architecture that comprises a memory bank, a cache, and a storage media that can retain data but still allow for reprogramming. Like the remote and local interfaces 115 and 145, the printer 130 may include direct memory access that can be used for data transfer with internal or peripheral devices without using a processor. In some embodiments, distributed memory within the remote and local interfaces 115 and 145 is used by the printer 130 to process printing requests, update user or client software, store status data, pass parameters, and/or allow realtime interactive information exchange between the printer 130 and the remote and local interfaces 115 and 145.

As shown in FIG. 1, the printer 130 includes a user interface 165. The user interface 165 also allows a user to select printing features and specify print options for a print request or for a specific document. For instance, the user interface 165 can monitor the status of a print job, review user requests such as a request for a two sided flip on a long edge format, or a request for a document on a colored paper such as red paper. In this embodiment, the illustrated user interface 165 encompasses any user selection device or command based device such as touch screens, light pens, graphical user interfaces (GUI), and/or command based systems.

Figure 2:
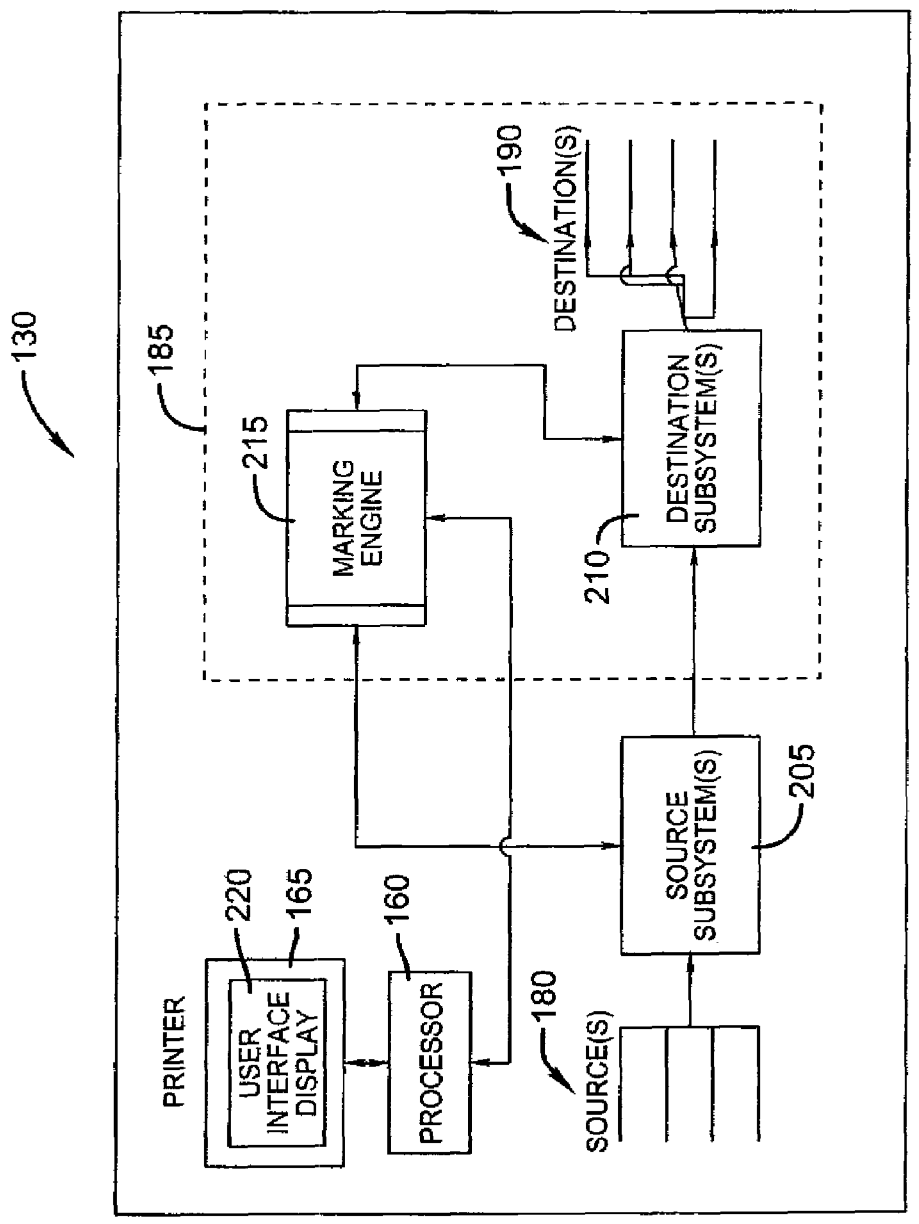
FIG. 2 is a partial diagram of FIG. 1 illustrating the source and destination subsystem(s).

The user interface 165 allows a user to view and update the attributes of media such as the size, color, weight, and type loaded in the input sources 180 shown in FIG. 2. Many different types of media may be used within one or among many documents. While some different types of medias originate from a common source in alternative embodiments, in this embodiment different types are drawn from separate sources. Some media sheets may receive printing while other media sheets are only inserted within a printed document.

As shown in FIG. 2, the printer 130 also includes one or more output destinations 190. These output destinations 190 can include a holding tray to receive finished printing jobs, a "trash exit" or a purge tray to receive disposed media, and/or a finishing tray. The finishing tray may be coupled to a stapler, a stacker, a folder, a binder, etc., or any combination of finishing process(es) and device(s). In this embodiment, each output destination can be coupled with one or more finishing processes or devices.

As shown in FIG. 2, media flow through the printer 130 is monitored by source and destination subsystems 205 and 210, wherein the source subsystem reports the media that has been fed and the destination subsystem reports the media that has been delivered. These subsystems 205 and 210 comprise sensors that detect media flow from each source to each output destination. The source and destination subsystems 205 and 210 communicate with the marking engine 215 through the processor 160. The marking engine 215 manages the printing process and monitors each media sheet as it is drawn from the source and delivered by a desired output destination. In this embodiment, the marking engine 215 tracks each sheet of media by an identification sequence, such as an identifying number.

The printer 130 includes a jam recovery system and method. The jam recovery automatically synchronizes ordered media within the source trays 180 to the status of a print job. The system and method selectively purges portions of the ordered media stored within the source trays 180 without monitoring the total number of sheets within an ordered media set or requiring a user to preprogram the printer 130 with the sequence of sheets that make up an ordered media set.

The jam recovery feature is initiated when a jam occurs such as when paper becomes stranded within the printer 130. When the jam is detected, the system and method of this embodiment alerts the user to the condition and provides interactive recovery instructions to clear the jam. Once cleared, the printer 130 initiates an automatic jam recovery method without further user intervention.

Figure 3:
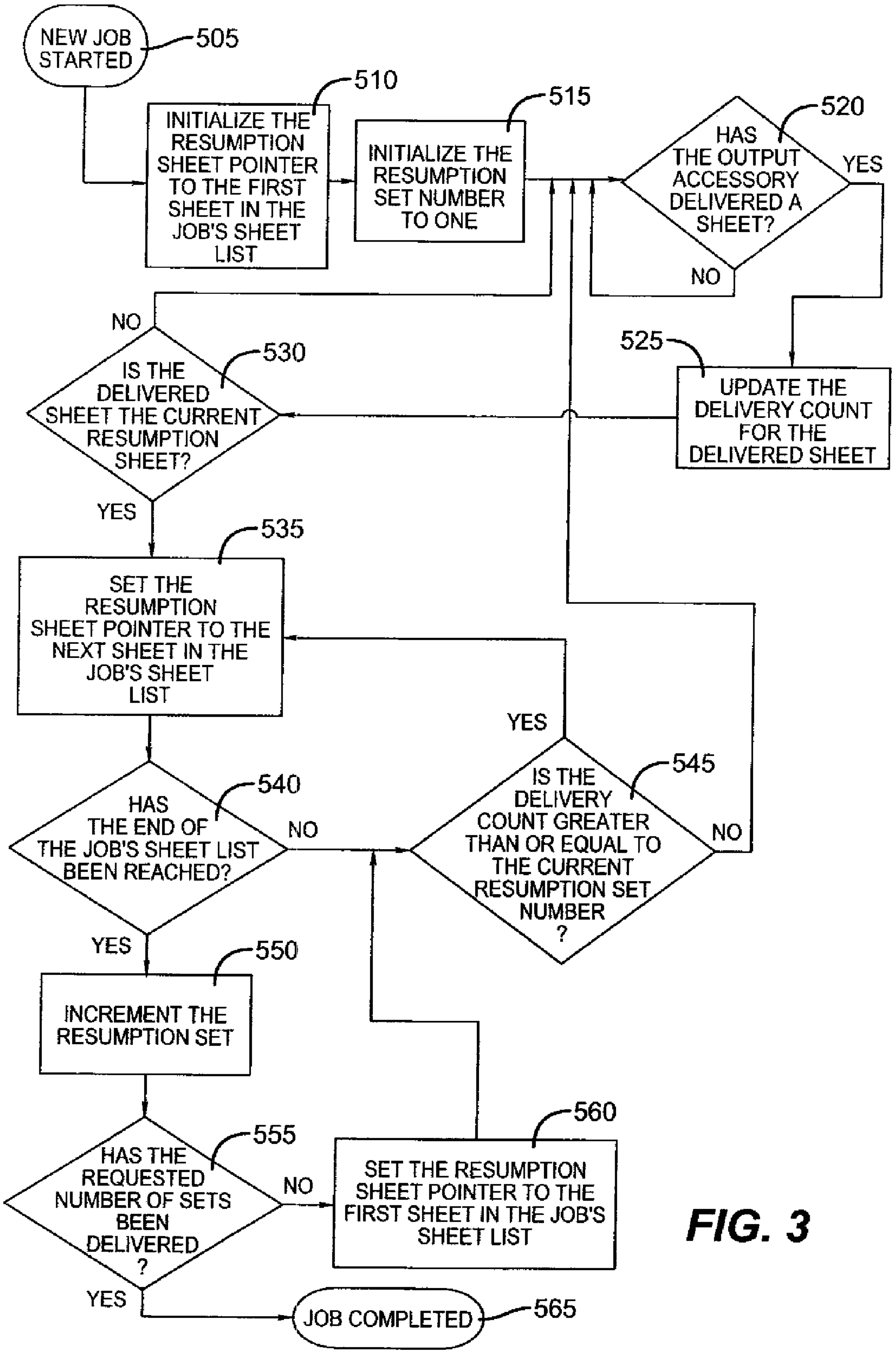
FIG. 3 is a flow diagram of a resumption sheet identifier method.

The method that identifies the resumption sheet is shown in FIG. 3. At act 505 the method begins with a new print job.

At act 510 the resumption sheet pointer is initialized by a link to the first sheet in a job's sheet list.

At act 515 the resumption set count is initialized to number 1. In the method, a set is the number of times each sheet will be printed.

At act 520 the marking engine 215 determines if a sheet has been delivered to an output destination. If optional printing process(es) were selected, the marking engine 215 determines if the finishing device(s) or process(es) have delivered the sheets. If a sheet has not been delivered to an output destination or finished, the resumption method enters a wait state until the marking engine 215 is notified of a delivery. At this point, the marking engine 215 is awaiting data indicating a delivery and the resumption sheet pointer is pointing to the first sheet in a job.

Once a sheet has been delivered to an output destination and/or finished by finishing device(s) or process(es), at act 525 the method updates a delivery count that tracks the delivered sheets before determining if the delivered sheet is the current resumption sheet at act 530.

If the delivered sheet is not the current resumption sheet, at act 520 the method waits for a sheet to be delivered to an output destination and/or processed by finishing device(s) or process(es).

If the delivered sheet is the current resumptions sheet, at act 535 the method links the resumption sheet pointer to the next sheet in the job's sheet list.

At act 540 the method determines if the resumption sheet pointer is pointing to the end of the job sheet list. If the end of the job sheet list has not been reached, the method determines if the delivery count of the new resumption sheet is greater than or equal to the current resumption set number at act 545.

If the delivery count is greater than or equal to the current resumption set number, the method sets the resumption sheet pointer to the next sheet in the job's sheet list at act at act 535. If the delivery count is not greater than or equal to the current resumption set number, at act 520 the method waits for a sheet to be delivered to an output destination and/or processed by finishing device(s) or process(es).

When the end of the job's sheet list is reached, the resumption set number is incremented at act 550.

At act 555, the method determines if the requested number of set has been delivered. If the requested number of sets have been delivered, the job concludes at act 565.

If there are still sets to be delivered, the resumption sheet pointer is linked to the first sheet in the job list at act 560.

Figure 4:
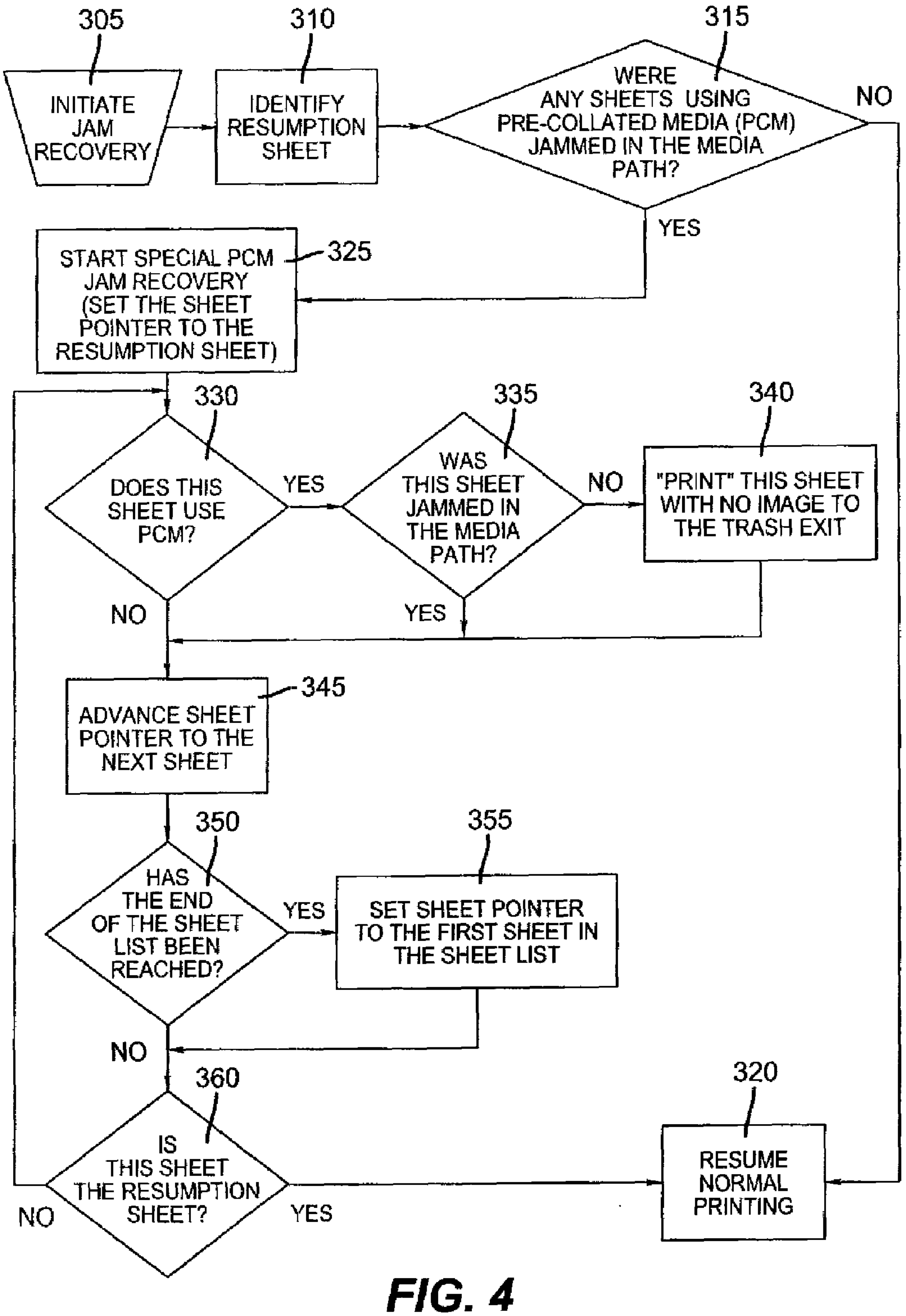
FIG. 4 is a flow diagram of a jam recovery method.

As shown in FIG. 4, the jam recovery method includes an ordered media jam recovery method. At act 305, jam recovery is initiated when the jam is cleared.

At act 310 a resumption sheet is identified. In this method, the marking engine 215 tracks each sheet passing through the media path 185 by an identification number stored within a table or a database within memory. In the method, the resumption sheet is identified by the method illustrated in FIG. 5 which is described below.

At act 315 the jam recovery method determines whether any ordered media is within the media path 185 by determining if media has been reported as fed, but has not been reported as being delivered. If ordered media is not detected within the media path 185 jam recovery is completed and printing resumes at act 320. If the marking engine 215 identifies ordered media within the media path 185, an ordered media jam recovery method is initiated at act 325.

At act 325 a sheet pointer is set to the address (memory location) of the resumption sheet. In this method, the pointer is pointing to the identifying number of the resumption sheet.

At act 330 the recovery method determines if the pointer is pointing to media drawn from an ordered media source. If the media did not originate from an ordered media source, the pointer is incremented to the next media sheet in the print job at act 345. If the selected media was drawn from an ordered media source, the ordered media jam recovery method determines if the media was jammed within the media path at act 335. In this embodiment, a sheet is in the media path 185 from the time it is successfully fed from an input source until it is delivered by an output destination. If optional finishing process(s) are used, in this embodiment a sheet is in path from the time it is successfully fed from an input source until it is delivered by the finishing device(s) or process(es).

If the selected media was in the media path 185 at act 335, the pointer is incremented to the next media sheet in the print job at act 345. If the selected media was not within the media path 185, the ordered media jam recovery method draws the next ordered media sheet from the source tray and transports it to a trash exit or purge tray at act 340. This is done without imaging the media, thereby conserving toner and reducing wear on the marking engine. The jam recovery method then increments the pointer to the next media sheet in the print job at act 345.

At act 350 the ordered media jam recovery method determines if the pointer has cycled through the entire media list (e.g., print request). If an end sheet is identified, which is the last sheet in a sheet list, the jam recovery method links the pointer to the first sheet in the sheet list at act 355.

At act 360 the jam recovery method determines if the pointer is pointing to the resumption sheet. If the pointer is pointing to the resumption sheet, media path jam recovery is completed and printing resumes at act 320. If the pointer is not pointing to the resumption sheet, the method continues at act 330.

As shown in FIG. 2, the system provides the user with a display 220 to assist the user in jam recovery. In one embodiment, the printer 130 identifies the point at which a jam occurs. The processor 160 generates a graphical representation and/or textural messages through the user interface 165 to indicate the location of the jam. If automatic means cannot clear the jam, the system can assist the user through interactive graphical representations and/or by messaging. In alternative embodiments, the user interface 165 can illustrate the process of jam recovery by identifying or illustrating the sheets of ordered media as they are stripped from the source tray and transported to the trash exit in real or delayed time.

The jam recovery method can be used with a variety of sequenced media. For example and referring to FIGS. 5*a* and 5*b*, assume a desired user job has four sheets wherein two user printed sheets are interspersed with two tab sheets and the ordered media source tray is loaded with a tab set comprising of two elements (two tab stock) as shown in FIG. 5*b* and a jam occurred with sheet 3 in the media path 185. The printer 130 generated a sheet list comparable to Table 1.

TABLE 1

| Sheet List | Order |
|---|---|
| Sheet 1 | Tab A |
| Sheet 2 | User 1 |
| Sheet 3 | Tab B |
| Sheet 4 | User 2 |

In this example, the system and method identifies the resumption sheet and links the pointer to sheet 3 after the user clears the jam. Because sheet 3 is ordered media, the system and method determines if the sheet was jammed in the media path 185 by referencing the table or database.

Because sheet 3 was jammed in the media path 185 and cleared by the user, the pointer is advanced to sheet 4. At this point, the end of the sheet list has not been reached and therefore the method determines if sheet 4 is ordered media. Because sheet 4 is not percolated media, the pointer is linked to sheet 1. At this point, the method recognizes sheet 1 as ordered media that was not jammed in the media path 185, and therefore processes a media sheet drawn from the ordered media source tray to a trash exit before advancing the pointer to sheet 2. Because sheet 2 is not ordered media, the pointer is advanced to sheet 3. Because sheet 3 is the resumption sheet, the jam recovery process ends and printing resumes.

The above described jam recovery system and method provide users with a convenient system and method that automatically restores ordered media to a proper sequence in the event of jam. By selectively purging media, the system and method automatically maintains output continuity after the jam is cleared by purging partially used sets of ordered media from source tray(s). The system and method do not require a user to preprogram the printer according to a sequence of ordered media. The system and method automatically arrange the correct placement of ordered insertions and ordered media without determining the sequence or number of sheets in an ordered media set.

Figure 6:
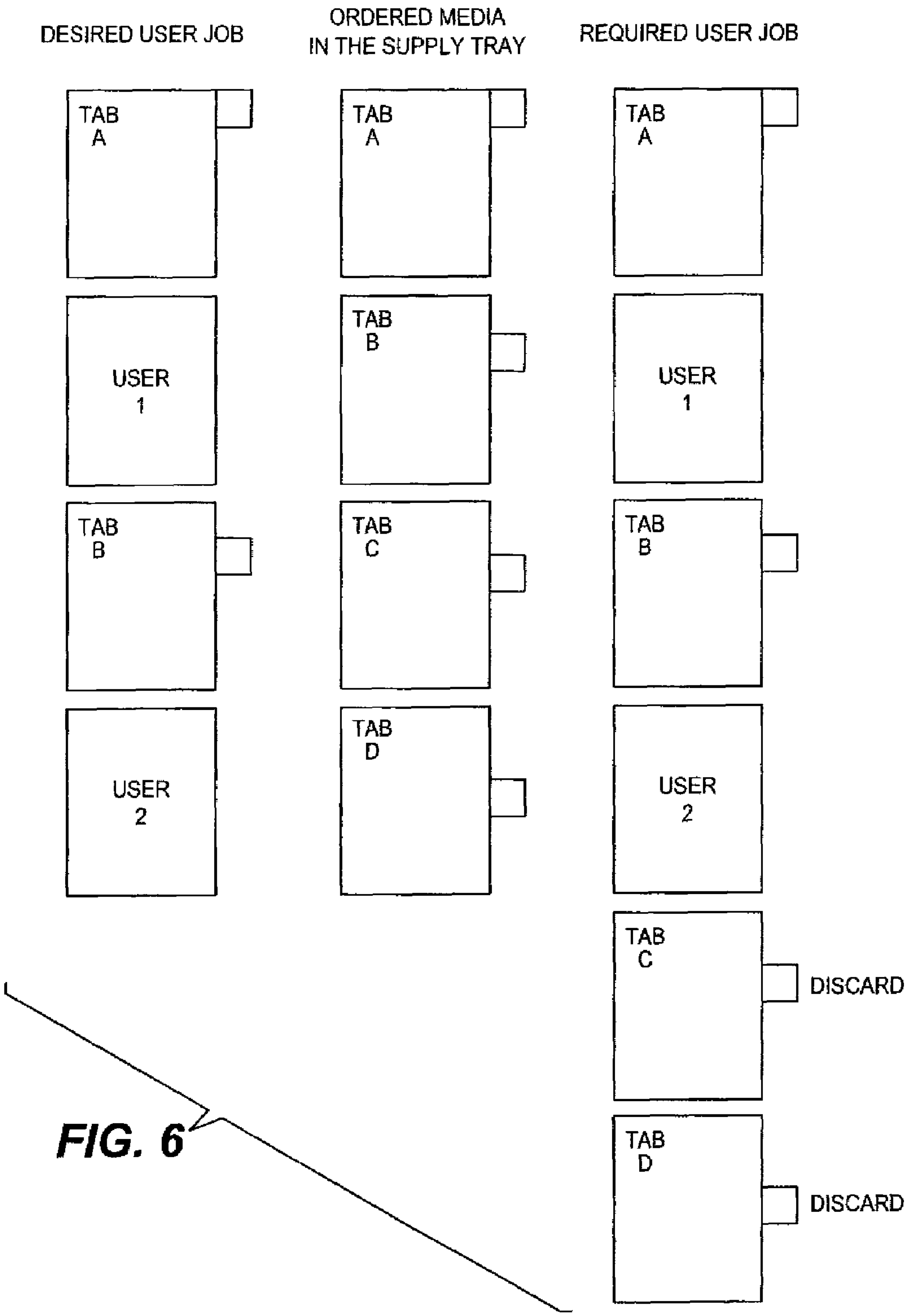
FIG. 6 is a block diagram of an exemplary desired user job, ordered media in the supply tray, and the required user job set up.

Referring now to FIG. 6, assume a desired user job has four sheets wherein two user printed sheets are interspersed with two tab sheets and the ordered media source tray is loaded with a tab set comprising of four elements (four tab stock). The required user job would have two tab discards at the end as shown.

Figure 7:
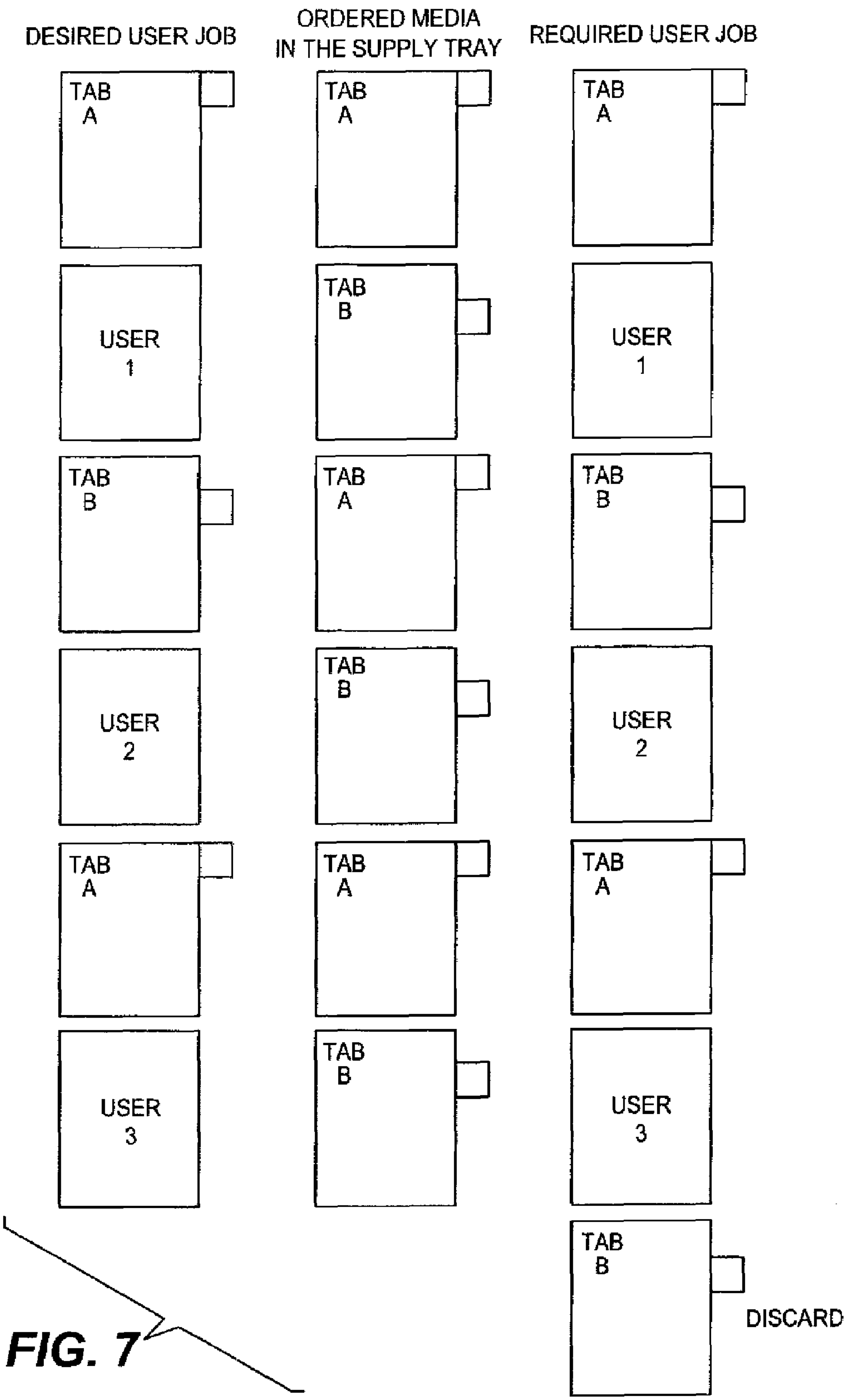
FIG. 7 is a block diagram of an exemplary desired user job, ordered media in the supply tray, and the required user job set up.

Referring now to FIG. 7, assume a desired user job has six sheets wherein three user printed sheets are interspersed with two tab sheets and the ordered media source tray is loaded with a tab set comprising of two elements (two tab stock). The required user job would have one tab discard at the end as shown.

It can be seen from FIGS. 6 and 7 that the customer job must account for the entire set or sets of the ordered media for the jam recovery method of the present invention to function properly. In other words, the proper number of consecutive discards from the ordered media in the ordered media supply tray must be accounted for for the entire job set.

The invention is not limited to a particular printing device. Any suitable printer can incorporate the jam recovery system and method. The system and method use one or more complete ordered media sets. This means that each ordered media set loaded in a source tray must have an equal number of elements. For example, in the above described application using two part tabs, each print job must use multiples of two sheets (e.g., uniform sets). For jobs requiring fewer tabs, a print request can transport unused tabs to the trash exit. For jobs requiring more tabs, multiple sets of tabs can be used.

Many other alternative embodiments are also possible. For example, the printer 130 may also process multiple supplies of different types of ordered media. In some alternative embodiments, the jam recovery system and method automatically restore one or more ordered medias to a proper sequence, respectively, in the event of a jam. When jams of multiple and/or different types of ordered media occur in one job, the jam recovery system and method processes different media sets separately or in parallel (e.g., concurrently). While various embodiments of the invention have been described, it will be apparent to those of ordinary skill in the art that many more embodiments and implementations are possible and are within the scope of this invention.

In addition, the acts illustrated in the flow diagrams may be taken in other sequences, and more or fewer acts and/or elements may be included or removed from the embodiments. It is therefore intended that the foregoing detailed description be regarded as illustrative rather than limiting, and that it be understood that it is the following claims, including all equivalents, that are intended to define the spirit and scope of this invention.

What is claimed is:

1. A printing method for recovering a printer from a cleared media jam of a print job having multiple output sets, each said set having media sheets including a plurality of sheets of ordered media having a repetitive sequence, the method comprising:

(1) printing the print job, said printing including the steps of:

initializing a resumption pointer in a sheet list of said print job, said sheet list having individual entries identifying each of the sheets in said sets, said resumption pointer designating a resumption sheet;

feeding said sheets into a media path through the printer to an output destination;

determining if each of said sheets has been delivered to said output destination;

setting said resumption pointer to a next said entry in said sheet list responsive to each said determining that a respective one of said sheets has been delivered;

repeating said initializing, feeding, determining, and setting steps for each of said output sets; and (2) during said printing, following occurrence and clearing of the media jam, the computer-implemented steps of:

setting a sheet pointer to a current said resumption sheet;

advancing said sheet pointer through a cycle of entries on said sheet list beginning with said resumption sheet until said resumption sheet is again reached;

during said advancing, purging respective said ordered media corresponding to said cycle of entries; and then, resuming the respective said feeding step.

2. The method of claim 1 further comprising tracking each of the sheets from an input source to the output destination.

3. The method of claim 1 further comprising:

receiving a print request that is associated with the sheet list that identifies how ordered media sheets will be processed; and wherein said feeding further comprises inserting respective said ordered media within a document according to the sheet list.

4. The method of claim 3 wherein the sheet list is generated by the printer when the printer receives the print request.

5. The method of claim 4 wherein the print request originates from a remote interface.

6. The method of claim 4 wherein the print request originates from a peripheral device communicatively linked to a remote interface.

7. The method of claim 3 further comprising an interface that provides interactive graphical assistance to a user when the jam occurs.

8. The method of claim 3 wherein the printer is a multiuser system that supports local and remote interfaces.

9. The method of claim 8 further comprising local and remote interfaces linked to the printer, the local and remote interfaces being configured to capture data to be processed by the printer from peripheral devices.

10. The method of claim 1 wherein said purging further comprises outputting said ordered media corresponding to said cycle of entries without printing.

11. The method of claim 1 wherein said output destination follows a finishing device.

12. The method of claim 1 further comprising detecting that each of said sheets is fed and wherein said setting is responsive to said detecting of respective said sheets.

13. The method of claim 1 wherein said sets are uniform and each said set includes both said plurality of sheets of ordered media and a plurality of other sheets of media.

14. A printing system for recovering a printer from a cleared media jam of a print job having multiple output sets, each said set having media sheets including a plurality of sheets of ordered media having a uniform repetitive sequence, the printer comprising:

a plurality of source trays;

ordered media loaded within one or more of the source trays;

an output destination coupled to the plurality of source trays by a path;

a marking engine receiving said ordered media from said source trays and delivering said ordered media to said output destination;

a destination subsystem detecting said delivering of each of said sheets; and a processor operatively connected to said marking engine, said processor generating a sheet list of the print job, said sheet list having individual entries identifying each of the sheets in said sets, said processor initializing a resumption pointer in said sheet list designating a resumption sheet and then setting said resumption pointer to a next said entry in said sheet list responsive to said detected delivering of each of said sheets, said processor recovering said printer following occurrence and clearing of the media jam by: setting a sheet pointer to a current said resumption sheet, advancing said sheet pointer through a cycle of entries on said sheet list beginning with said resumption sheet until said resumption sheet is again reached, and causing said marking engine to purge respective said ordered media corresponding to said cycle of entries during said advancing.

15. The printing system of claim 14 wherein the ordered media comprises uniform sets of ordered media.

16. The printing system of claim 14 further comprising a remote interface coupled to the printer through a network.

17. The printing system of claim 14 further comprising a local interface directly coupled to the printer.

* * * * *